United States Patent [19]
Khoury et al.

[11] 3,755,215
[45] Aug. 28, 1973

[54] PREPARATION OF OIL-MODIFIED POLYMERS FROM A POLYISOCYANATE COMPOSITION

[75] Inventors: Bruce Albert Khoury, Wilmington, Del.; Frederic Warren Yeager, Pennsville, N.J.

[73] Assignee: E. I. du Pont de Nemours and Company, Wilmington, Del.

[22] Filed: Nov. 29, 1971

[21] Appl. No.: 203,033

[52] U.S. Cl. ...... 260/2.5 AT, 252/182, 260/2.5 AL, 260/33.6 UB, 260/75 NT, 260/77.5 AT
[51] Int. Cl. ............................................ C08g 22/44
[58] Field of Search .............. 260/2.5 AT, 77.5 AT, 260/75 NT, 453 AR, 33.6 UB, 2.5 AL; 252/182

[56] References Cited
UNITED STATES PATENTS

| | | | |
|---|---|---|---|
| 3,314,903 | 4/1967 | Belak et al. | 260/2.5 AL |
| 3,390,119 | 6/1968 | Alexander et al. | 260/33.6 UB |
| 3,471,417 | 10/1969 | Dickert | 260/2.5 AT |
| 3,522,285 | 7/1970 | Kirss | 260/77.5 AT |

FOREIGN PATENTS OR APPLICATIONS

| | | | |
|---|---|---|---|
| 923,643 | 4/1963 | Great Britain | 260/2.5 AL |

*Primary Examiner*—Donald E. Czaja
*Assistant Examiner*—M. J. Welsh
*Attorney*—Melville J. Hayes

[57] ABSTRACT

A polyisocyanate composition having beneficial utility in the manufacture of polyurethane foams and other polymer products, and comprising certain proportions of tolylene diisocyanate (TDI), a phosgenation residue component and a specified type of hydrocarbon oil. Also a process for making polyurethane and polyurea products by causing said polyisocyanate composition to react with a polymeric polyol or other suitable active hydrogen-containing compound.

5 Claims, No Drawings

3,755,215

PREPARATION OF OIL-MODIFIED POLYMERS FROM A POLYISOCYANATE COMPOSITION

BACKGROUND OF THE INVENTION

This invention relates to polyisocyanate compositions which can be used in the manufacture of polymer products. It also relates to the use of such compositions in the manufacture of polyurethane and polyurea polymers, and to the resulting products.

The industries which manufacture and use polyurethane foams and other polyurethane and polyurea polymer products are in need of a more economical way to produce these products. Especially needed is a way to reduce the over-all cost of raw materials used in making these products. Also needed is a way to manufacture polyurethane foams that permits faster removal from the molds in which they are formed. Furthermore, those who manufacture TDI (tolylene diisocyanate) for use in making polyurethanes and the like have been seeking a way to overcome the cost and ecological problems associated with the disposal of the phosgenation residue by-product obtained in making TDI.

SUMMARY OF THE INVENTION

The present invention provides a polisocyanate composition which comprises

A. about 10–90 percent by weight of tolylene diisocyanate,

B about 5–50 percent by weight of a residue component composed of the substantially nonvolatile by-product substance which is formed during the preparation of tolylene diisocyanate by phosgenation of tolylene diamine in an organic solvent, and which remains in the still heel after distilling off the volatile impurities, and C about 3–50 percent by weight of a hydrocarbon oil having a molecular analysis by the clay-gel method of ASTM D-2007 of about 50–100 percent by weight of aromatic hydrocarbons, about 0–35 percent by weight of saturated hydrocarbons, and about 0–30 percent by weight of polar compounds.

The invention also provides a process for preparing oil-modified polyurethane or polyurea polymers which comprises I. providing a polyisocyanate composition as defined in the previous paragraph, II. bringing said composition into contact with at least one active hydrogen-containing compound selected from the group: polyfunctional hydroxy compounds, polyfunctional amines, polyfunctional amino alcohols and water, and III. allowing said composition to remain in contact with said active hydrogen-containing compound under conditions which permit the latter to react with components A and B until an oil-modified polyurethane or polyurea polymer is formed.

In addition, there are provided polyurethane and polyurea polymer products made by this process, including polyurethane foams.

DESCRIPTION OF PREFERRED EMBODIMENTS

The TDI (component A) content of the novel composition is preferably about 25–70 percent by weight in many applications, especially when the composition is to be used in making polyurethane foams. One can determine the TDI content of the composition by measuring the amount of TDI which can be removed from the composition by distillation.

The preferred phosgenation residue (component B) content of the composition is usually about 15–35 percent by weight. The residue contains complex polyisocyanates. In most applications about 50–100 percent by weight of component B is composed of a mixture of (1) biuret, (2) carbodiimide, (3) polycarbodiimide, (4)tolylene diisocyanate trimers, and (5) a product of reacting phosgene or hydrochloric acid with at least one of components (1), (2) and (3); isocyanate groups being present in (1), (2), (3), (4) and (5). The ratio of the residue ingredients tends to vary according to such factors as phosgenation temperature, pressure and time, and the concentration and purity of the raw materials used to prepare the TDI. Phosgenation residues formed in the manufacture of TDI are complex mixtures which it is believed cannot be characterized completely and accurately by known analytical methods. Therefore, the residue can best be defined broadly in the manner set forth above in the first paragraph under summary of the invention. The residue is substantially non-volatile; thus, none or practically none of it will distill at 200° C. at a reduced pressure of about 1–5 mm. of mercury.

In the past, it has been common practice to dispose of the phosgenation residue as a useless waste material. However, disposing of the residue in large quantities presents problems since the cost of using disposal methods which prevent contamination of the environment must be added to the other costs of producing the TDI.

Some of the most useful embodiments of the composition have an oil (component C) content of about 15–35 percent by weight; and contain an oil having an aromatic hydrocarbon content of about 65–90 percent by weight, a saturated hydrocarbon content of about 0–25 percent by weight, and a polar compound content of about 5–25 percent by weight. An oil derived from petroleum is usually preferred for economic reasons.

In certain preferred applications, the composition has an amine equivalent of about 120–160 (ASTM D1638) and a Brookfield viscosity of about 150–800.

In carrying out the process of this invention, the step I polyisocyanate composition can be mixed in step II with water or with any polyfunctional hydroxy compound, polyfunctional amine or polyfunctional amino alcohol known to be useful in the preparation of polyurethanes and polyureas. Mixtures of two or more such compounds can also be used. It is often preferred that step II comprises mixing a polyfunctional hydroxy compound with the step I composition in proportions such that the resulting mixture contains about 0.9–2 equivalents of isocyanate groups per equivalent of said hydroxy compound. However, an isocyanate content somewhat outside this range can also be used in some cases. Preferably said hydroxy compound is a polymeric polyol selected from the group: polyalkylene ether polyols, hydroxyl-terminated polyaliphatic hydrocarbons and polyesters containing a plurality of hydroxyl groups. Especially preferred are polyalkylene ether polyols having a functionality of 2–8 and an equivalent weight of about 10–2500.

In another embodiment of the process, a layer of the polyisocyanate composition is exposed to moisture in the air until a polymer is formed by the reaction of the moisture with the polyisocyanate components of the composition. Active hydrogen-containing compounds of the type mentioned above in the description of the novel process are well known in the art and include any such compounds known to be useful in making polyurethanes and polyureas.

One skilled in the art will have no difficulty in selecting a suitable temperature for the step III reaction according to such well-known factors as the reactivity of the particular components present and the desired rate of production. In many cases, the reaction will proceed satisfactorily at ordinary room temperature.

It is also a highly preferred embodiment to add a blowing agent to the polymer-forming composition, and to activate the blowing agent so that a foamed polymer product is formed. The blowing agent and method of using it can be selected from those already well known in the art of preparing foamed polyurethane and polyurea products. The polymer-forming composition can also contain other additives known to be useful in the preparation of polyurethanes and polyurea products, for example catalysts, emulsifiers, coloring agents, fillers, additional polyisocyanate compounds and the like.

In order to provide the polyisocyanate composition as required in step I, one can carry out the operations of preparing a crude tolylene diisocyanate (TDI) composition containing said residue component by phosgenation of tolylene diamine in an organic solvent and removing volatile impurities including phosgene and hydrochloric acid by distillation, and after said phosgenation, adding said hydrocarbon oil. Any suitable known phosgenation procedure can be used.

It is preferred in many cases to add the oil after the distillation of impurities; however, all or part of the oil can also be added before said distillation. The mixture of crude TDI and oil can be subjected to distillation conditions whereby the distillate contains about 1–98 percent by weight of the TDI formed by said phosgenation and the still heel contains the residue component and the oil. Removal of all of the TDI would result in unnecessary expense, and might cause the residue component to undergo changes which would reduce or destroy its utility in the process of this invention. The removed TDI can of course be sold for use in applications requiring a relatively pure grade of TDI. If the TDI content of the resulting still heel (polyisocyanate composition) is too low for a certain use of the present process, enough TDI can be added so that the composition has the desired TDI content.

It is sometimes beneficial to have a stripping agent for TDI present while at least a portion of the TDI to be removed from said mixture is distilled off. A preferred stripping agent is ortho-dichlorobenzene, which is also a preferred solvent to use in the phosgenation step. Other suitable volotile liquids which codistill with the TDI can also be used as the stripping agent, for example toluene and chlorobenzene. The stripping agent preferably boils at a sufficiently lower temperature than the TDI to be easily separated therefrom.

The tolylene diamine used in the phosgenation reaction is usually composed of a mixture of isomers, for example a mixture of (a) 2,4-tolylene diamine and (b) 2,6-tolylene diamine in which the (a)/(b) weight ratio is about 50:50 to 99:1, preferably about 80:20. The mixture of isomers can also contain a small amount of one or more of the following: 2,5-tolylene diamine, ortho diamines (preferably not over 1 percent), 2,3-tolylene diamine, 3,4-tolylene diamine, and high-boiling by-products formed during the diamine preparation by hydrogenation of dinitro toluene. Said by-products become a part of the residue component used in the present invention; they contain amine groups, and they are converted to high-boiling polyisocyanates during the phosgenation reaction period. So far as is known, no one has yet been able to define the exact chemical composition of this residue ingredient.

The polyisocyanate composition of this invention is a useful article of commerce which can be sold and shipped to various companies for use in the manufacture of polyurethane and polyurea polymer products by employing the present process. It is quite unexpected that this composition is so useful in preparing such products. The composition and process of this invention permit a considerable reduction in the cost of manufacturing such polymer products, thereby making the resulting polyurethanes and polyureas more competitive with other materials which can be used in a particular application. The invention permits a marked reduction in material cost since the oil and residue components are much less expensive than TDI. And the cost of making the TDI is reduced in view of the use of the residue component and resultant elimination of the above-mentioned cost and ecological problems related to disposing of the phosgenation residue. There is also a handling advantage with the present polyisocyanate composition since it is less toxic and unpleasant to handle than pure TDI. Moreover, polyurethane foam products can be produced with improved efficiency by the present process since the process permits the use of shorter molding periods and fewer molds. The process can be used to produce rigid foams (for example for refrigerator insulation) or resiliant foams (for example for cushions and mattresses). Polymers prepared by the present process can also be used in the manufacture of non-cellular molding compositions, coating compositions, adhesives and other products in which prior art urethanes and polyureas are known to be useful.

The following examples illustrate the invention; all amounts are by weight unless otherwise indicated.

EXAMPLE I

A polyisocyanate composition having utility in the manufacture of polyurethane foam is prepared by (1) dissolving tolylene diamine (80 percent of 2,4-isomer and 20 percent of 2,6-isomer) in ortho-dichlorobenzene (ODCB) and phosgenating the diamine in the manner described in Example 6 of U.S. Pat. No. 2,822,373 issued to T. R. Beck except the reaction zone temperature is 150° C;

(2) using fractional distillation to remove the ODCB, phosgene and hydrochloric acid from the resulting composition, thereby obtaining as the still heel a crude TDI composition containing a substantially non-volotile phosgenation residue composed predominantly of a mixture of by-product ingredients as set forth above in the description of preferred embodiments; the crude TDI composition has a TDI content of about 90 percent, a residue content of about 10 percent and an amine equivalent of about 98 based on the analysis for -NCO groups by method ASTM D1638;

(3) mixing 8 parts of oil with 100 parts of the resulting crude TDI composition, the oil being a petroleum-derived hydrocarbon oil having a molecular analysis by the clay-gel method of ASTM D-2007 of 76 percent aromatic hydrocarbons, 6 percent saturated hydrocarbons and 18 percent polar compounds;

(4) subjecting the resulting mixture to distillation at 160° C and 36 mm. Hg. to remove TDI until the still heel has a TDI content of 56 percent, a residue content of 25 percent, an oil content of 19 percent, an amine equivalent of 145, and a Brookfield viscosity of 700 cps. at 25° C. The TDI content of the still heel can be determined by distilling off the TDI at a temperature of 200° C and a pressure of 1 mm. Hg.

The use of the resulting polyisocyanate composition in the manufacture of a polyurethane foam is illustrated below in Example 4.

Example 1 can be modified if desired by using a stripping agent in step 4, for example, by feeding ODCB continuously into the distillation vessel at a temperature and pressure sufficient to permit the ODCB to vaporize and carry the TDI out with it, and passing a continuous stream of the distilled TDI and ODCB out of the vessel.

EXAMPLE 2

Another polyisocyanate composition of this invention, the utility of which is illustrated below in Example 3 is prepared by repeating Example 1 except:

In step 3, the amount of oil used is 10 parts.

In step 4, the distillation is conducted at 164° C and 21 mm. Hg. until the still heel has a TDI content of 30 percent, a residue content of 35 percent, and an oil content of 35 percent.

Then, as step 5, 100 parts of the resulting still heel are mixed with 100 parts of a crude TDI composition prepared by repeating steps I and II.

The resulting polyisocyanate composition has a TDI content of 60 percent, a residue content of 22 percent, an oil content of 18 percent, an amine equivalent of 135, and a Brookfield viscosity of 165 cps. at 25° C.

EXAMPLE 3

Flexible polyurethane foam seat cushions are prepared by (a) mixing 54 parts of a polyisocyanate composition which has been made in the manner described in Example 2 with 110 parts of a composition containing active hydrogen containing compounds and made by blending the seven ingredients shown below in Formula 3.1, the mixing of the two compositions being conducted for eight seconds at 24° C;

(b) pouring 690 grams of the resulting mixture into each of the cushion molds being used and closing the lid of each mold, each of the molds being a conventional polyurethane foam cushion mold heated to 55° C and measuring 15 in. × 15 in. by 4 in.;

(c) 22 minutes after completing step b, opening each mold and removing the polyurethane foam seat cushion which has formed therein.

FORMULA 3.1

| Ing. No. | | Parts |
| --- | --- | --- |
| 1 | Polyoxypropylene ether triol based on trimethylolpropene, capped with ethylene oxide, ratio of ethylene oxide/propylene oxide 13/87, number average molecular weight about 4700. | 100.0 |
| 2 | Polyamine prepared by condensing aniline and o-chloroaniline with formaldehyde as described in Example 6 of U.S. Pat. No. 3,563,906. | 3.5 |
| 3 | Polydimethylsiloxane oil, 5 centistoke grade | 0.025 |
| 4 | Triethylene diamine (33% solution in dipropylene glycol). | 0.9 |
| 5 | N-ethyl morpholine | 0.5 |
| 6 | Water | 2.7 |
| 7 | Tris(2,3-dibromopropyl) phosphate | 3.0 |

Ingredient No. 3 tends to enhance foam cell uniformity. Ingredients No. 4 and 5 serve as catalysts; Ingredient No. 6 serves as a blowing agent. And Ingredient No. 7 enhances the flame-retardant and compression set properties of the product.

The mixture resulting from step (a) has an -NCO index of 103; thus, for each 103 equivalents of -NCO groups provided by the polyisocyanate composition, 100 equivalents of active hydrogen are provided by ingredients 1, 2 and 7 of Formula 3.1.

A cushion prepared according to Example 3 is tested by the procedures of ASTM D-1564. The results are shown below in Table I.

TABLE I

| | |
| --- | --- |
| Density, overall lb/cu. ft. | 29.4 |
| Tensile strength, psi | 15 |
| Elongation at Break, % | 93 |
| Split tear, pli (lbs./linear inch) | 1.2 |
| Indent load, psi for 50 sq. in. | |
| 25% Deflection | 42 |
| 65% Deflection | 125 |
| 25% Return | 32 |
| Sag Factor | 3.0 |
| Compression Set, ASTM Method B, | |
| 50% Deflection, % | 37 |
| Ball drop resilience % | 55 |

EXAMPLE 4

A high density rigid polyurethane foam for use as a wood simulation material in the manufacture of furniture is prepared by (a) mixing 110 parts of a polyisocyanate composition which has been made in the manner described in Example 1 with 118 parts of a composition made by blending the ingredients shown below in Formula 4.1, the mixing of the two compositions being conducted for 50 seconds at 24° C;

(b) pouring the resulting mixture at once into an open-top metal mold heated to 55° C and measuring 12 in. × 12 in. × 1 in.;

(c) allowing the foam to form.

FORMULA 4.1

| | Parts |
| --- | --- |
| Polypropylene ether polyol, equivalent weight 161, viscosity 6500 cps. at 25°C., density 1.09 gr./ml. at 25°C. ("Selectrofoam" 6452 from PPG Industries, Pittsburgh, Pa.) | 116.0 |
| Foam stabilizing surfactant, a hydrolytically stable polyoxyalkylene polydimethylsiloxane block copolymer, (DC-193 from Dow Corning Corp., Midland, Michigan) | 1.5 |
| Tin mercaptide catalyst, ("Markure" UL-1 from Argus Chemical Corp., Brooklyn, N.Y.) | 0.15 |
| Water | 0.5 |

The foam reaches its maximum height in 120 seconds; and quite surprisingly it is strong enough to be stripped from the mold 6 minutes after the start of step (a). This 6 minute value for the period before stripping is relatively low when compared with values obtained in a similar procedure wherein the polyisocyanate composition of step (a) is replaced with polyisocyanate materials outside the invention and representative of those which have been used for the manufacture of wood simulation type polyurethane foam. Properties of the Example 4 foam product include the following: molded density of 14.7 lbs./cu. ft. (test method ASTM D-1622), compressive strength of 620 psi at 7 percent deflection (ASTM D-1621), nail holding value of 24 pounds (ASTM D-1761) and screw holding value of 90 pounds (ASTM D-1761).

EXAMPLE 5

A rigid polyurethane foam which is useful as an insulation material is prepared by (a) mixing 126 parts of a polyisocyanate composition made according to Example 1 with 145 parts of a composition made by blending the ingredients shown below in Formula 5.1, said mixing being conducted at 25° C;

(b) pouring the resulting mixture into an open-top mold which is at 25° C; and (c) allowing the foam to form.

FORMULA 5.1

| | Parts |
|---|---|
| Polypropylene ether polyol, equivalent weight 120, viscosity 22,000 cps. at 25°C., amine nitrogen about 1.2% ("Selectrofoam"6406 from PPG Industries, Pittsburgh. Pa.) | 100 |
| Foam stabilizing surfactant of Formula 4.1 | 2.0 |
| N,N-Dimethylethanolamine | 0.8 |
| Triethylene diamine | 0.2 |
| Trichlorofluoromethane | 42.0 |

Some properties of the Example 5 foam product, and the test methods used, are shown below in Table II.

TABLE II

| | |
|---|---|
| Density, Free-blown core, lbs./cu. ft. ASTM D1622 | 2.0 |
| Compressive Strengh psi | |
| Parallel to blow (14% deflection) | 30 |
| Perpendicular to blow (11% deflection) ASTM D1621 | 20 |
| K factor, BTU/hr./ft.$^2$/°F./in. | |
| Original | 0.102 |
| Aged 4 weeks, 25°C., cut sample ASTM C177 | 0.140 |

EXAMPLE 6

A polyurea coating composition useful for the application of hard coatings on various substrates is prepared and evaluated by (a) mixing 8 parts of xylene with 100 parts of a polyisocyanate composition made according to Example 2; (b) mixing 1.5 parts of N,N-dimethylethanolamine with 50 parts of N,N-dimethyloleamide; (c) blending the mixture obtained in step (a) with the mixture obtained in step (b), thereby obtaining a coating composition which remains fluid and useful when stored for twenty-four days or more out of contact with moisture; (d) using a paint brush or apply three coats of the coating composition obtained in step (c) to plywood test panels and steel plates, each coat being about 2 mils thick when dry, and drying to the touch in about 30 minutes. The first coat is dried for 4 hours at 25° C, the second for 24 hours and the third for 24 hours. The resulting hard, three-coat polymeric layer has a Sward Hardness of 32 (test method ASTM D2134).

EXAMPLE 7

A polyurethane elastomer is prepared by first mixing 100 parts of the polyisocyanate composition obtained in Example 2 with 370 parts of polytetramethylene ether glycol (heated to 40°C) having a number average molecular weight of about 1000, and 0.4 part of dibutyltindilaurate. The mixture is poured into a 6 in. × 6 in. × 0.075 in. mold heated to 100° C. After maintaining the mold at 100° C for 40 minutes, the sample is cured in a press for three hours at 100° C. The sample is then removed from the mold and post cured at 70° C for 16 hours. The resulting elastomer has a Shore A Hardness of 56 (ASTM D676), a tensile strength of 457 psi (ASTM D412), and an elongation at break of 287 percent (ASTM D412).

We claim:

1. A process for preparing oil-modified polyurethane or polyurea polymers which comprises
   I. Providing a composition comprised of
      (A) about 10–90 percent by weight of tolylene diisocyanate,
      (B) about 5–50 percent by weight of a residue component composed of the substantially nonvolatile by-product substance which is formed during the preparation of tolylene diisocyanate by phosgenation of tolylene diamine in an organic solvent, and which remains in the still heel after distilling off the volatile impurities, and
      (C) about 3–50 percent by weight of a hydrocarbon oil having a molecular analysis by the clay-gel method of ASTM D-2007 of about 50–100 percent by weight of aromatic hydrocarbons, about 0–35 percent by weight of saturated hydrocarbons, and about 0–30 percent by weight of polar compounds,
   II. bringing said composition into contact with at least one active hydrogen-containing compound selected from the group: polyfunctional hydroxy compounds, polyfunctional amines, polyfunctional amino alcohols and water, and
   III. allowing said composition to remain in contact with said active hydrogen-containing compound under conditions which permit the latter to react with components A and B until an oil-modified polyurethane or polyurea polymer is formed; step I of said process comprising the operations of
      (a) preparing a crude tolyene diisocyanate (TDI) composition containing said residue component by phosgenation of tolylene diamine in an organic solvent and removing volatile impurities including phosgene and hydrochloric acid by distillation,
      (b) after said phosgenation, adding said hydrocarbon oil, and
      (c) subjecting the resulting mixture of crude TDI and oil to distillation conditions whereby the distillate contains about 1–98 percent by weight of the TDI formed by said phosgenation and the still heel contains the residue component and the oil.

2. A process according to claim 1 wherein a stripping agent for TDI is present while at least a portion of the TDI to be removed from said mixture during operation (c) is distilled off.

3. A process according to claim 1 wherein step II comprises mixing a polyfunctional hydroxy compound with the step I composition in proportions such that the resulting mixture contains about 0.9-2 equivalents of isocyanate groups per equivalent of said hydroxy compound.

4. A process according to claim 3 wherein said hydroxy compound is a polymeric polyol selected from the group: polyalkylene ether polyols, hydroxyl-terminated polyaliphatic hydrocarbons and polyesters containing a plurality of hydroxyl groups.

5. A process according to claim 4 wherein a blowing agent is added to the mixture, and the blowing agent is activated so that a polyurethane foam is formed.

* * * * *